Oct. 23, 1928.
J. R. CAMBRON
SWINGING AUTOMOBILE HEADLIGHT
Original Filed Jan. 2, 1926
1,689,167
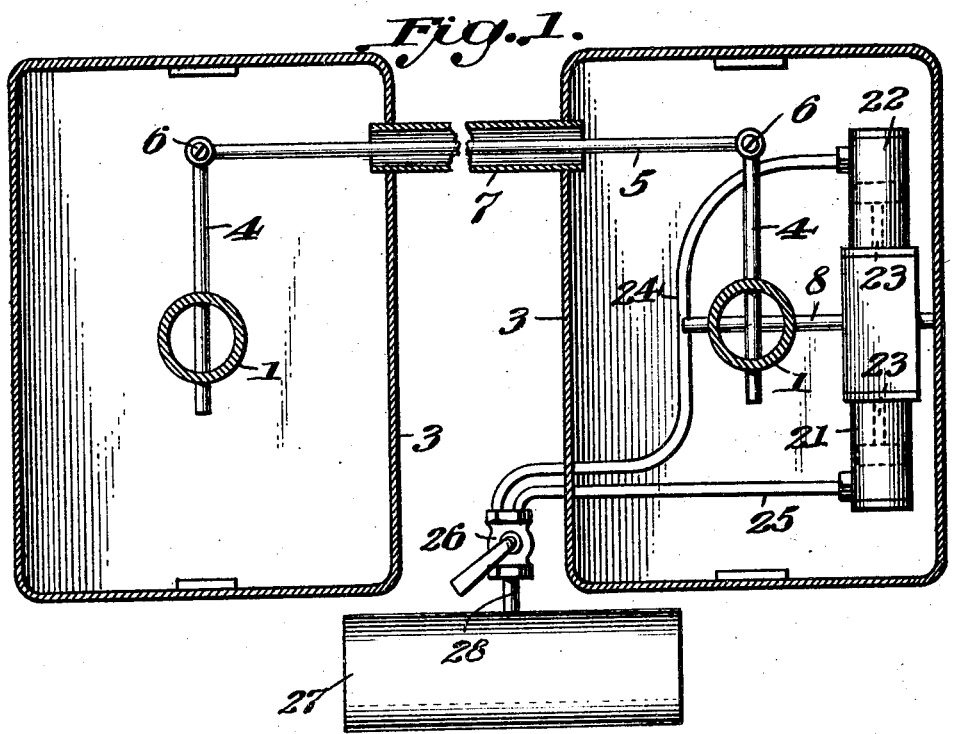
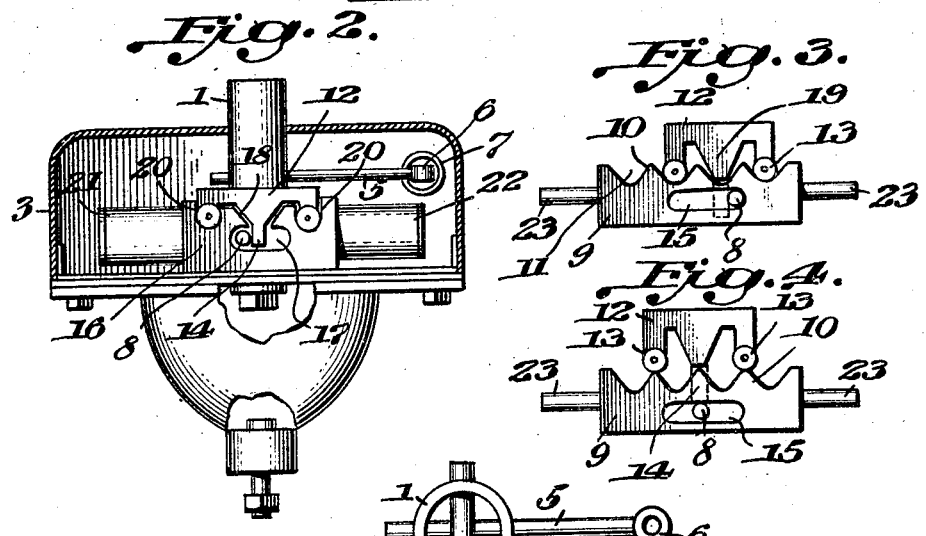
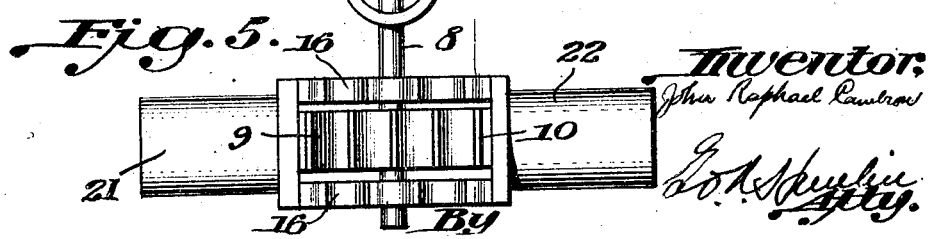

Patented Oct. 23, 1928.

1,689,167

UNITED STATES PATENT OFFICE.

JOHN RAPHAEL CAMBRON, OF EVANSVILLE, INDIANA.

SWINGING AUTOMOBILE HEADLIGHT.

Application filed January 2, 1926, Serial No. 78,873. Renewed September 12, 1928.

This invention relates to swinging automobile headlights.

My object is the provision of novel means for swinging automobile headlights from their normal, straight ahead, position, so that they will be disposed angularly or turn laterally toward the outer side of the road or street and thus the rays of light may be turned to one side so that they will not strike in the face of the driver of a car coming from the opposite direction.

Usually, deflecting the headlights through an arc of ten to fifteen degrees, more or less, will be sufficient to so change the directions of the rays of light, that, while the road ahead will be illuminated sufficiently the light will not strike the driver of an approaching car. The invention is not limited to means which will deflect or turn the headlights through only ten to fifteen degrees.

My invention relates to the operating means for swinging the headlights and locking them either in straight ahead or deflected arrangement. I may employ pistons and cylinders to accomplish the swinging of the headlights, or, electrical or electro-magnetically actuated means may be employed for that purpose. Consequently, unless specifically set forth in the claims, it is to be understood that the invention is not limited to the particular means shown and described for swinging the headlights and that motive fluid pressure in connection with pistons and cylinders subject to suitable valve control may be used, or, electro-magnets, solenoids, or other electrically energized devices can be used.

By way of illustration, I have shown air controlled pistons and cylinders, subject to suitable valve control for operating the headlights.

It is unnecessary to deflect the operating and locking mechanism in connection with both headlights as a single mechanism for this purpose is sufficient inasmuch as my invention proposes to cross-couple the headlights by suitable connections so that they will be moved in unison.

In carrying out the invention, an operating arm is provided for one of the headlight mountings and the headlight mountings are provided with arms which are cross connected by a rod.

The operating arm is actuated one way or the other by a toothed member or rack and there is provided a novel locking device for co-operating with said rack and with the operating arm. The effect is that the operating arm is latched in its normal position to hold the headlights so that they will point straight ahead, or, said arm is latched in its rocked position to lock the headlights in deflected position. The rack is operated by pistons and cylinders, armatures and solenoids, or any other means as may be desired.

One embodiment of the invention is shown in the accompanying drawings and set forth in the following specification.

I wish it understood that modifications may be made in the improved operating mechanism, regardless of the particular means, such as pistons and cylinders, solenoids, etc. which may be used to actuate said operating mechanism.

In the accompanying drawings:

Figure 1 is a horizontal section through the housings and mounting for the headlights, the operating means being shown in full lines;

Figure 2 is a vertical section through one of the housings, the operating mechanism being shown in full lines;

Figures 3 and 4 are both side elevations of the shifting and locking mechanism; and Figure 5 is a detail plan view of the shifting mechanism, the guide plates, the cylinders and the mounting, the locking device or latch being omitted.

Mountings 1 are provided which are adapted to turn in brackets 2 carried by the automobile. The headlights are carried by the mountings 1. The operating mechanism need not be duplicated and it is contained within the housing 3, separate housings being provided for the respective mountings 1.

Each mounting 1 has an arm 4, the arms being cross connected by a rod 5 pivoted to them at 6 and running freely through a tube 7. The rod is thus protected from injury and from the weather.

The rockable mounting 1 carries a fixed operating arm 8 by which said mounting is rocked, and the other mounting 1 is correspondingly turned through the connections 4, 5.

The rack 9 having teeth 10 and interdental spaces 11 constitutes the means for swinging the arm 8 to one position or the other. The walls of the teeth 10 serve as cams for operating a latching device 12 by which the rack 9 is held in one position or the other. When the rack 9 is shifted the rollers carried by the latching device ride upwardly on the inclined or cam walls of the teeth and the arm 8 is then released so that the rack 9 may shift the arm 8. After such shifting has occurred the rollers 13 descend into the interdental spaces 11 and thus lock the rack and at the same time a projection 14 on the latching device 12 locks the arm 8 against movement in the slot 15 in the rack.

To limit the latching device 12 to an up and down movement and to insure that the arm 8 will be latched after it has been moved, plates 16 are provided which have guides 17 corresponding to the slot 15 and are provided with mouths 18 leading to said guides. The mouths have inclined sides to act on correspondingly inclined parts of a guiding projection 19. The guide plates 16 are provided with slots 20 to receive parts of the latching device 12 to assist in guiding said latching device in its up and down movement.

It is within the spirit of my invention to employ either air operated means or electromagnetically operated means, such as solenoids, for instance, for the purpose of shifting the rack 9 to and fro.

I have illustrated cylinders 21 and 22 in which are pistons connected to a common piston rod 23 attached to the rack 9. The cylinders are respectively subject to fluid pressure through pipes 24 and 25, controlled by a suitable valve 26 to which the fluid pressure is delivered from a tank 27 by a pipe 28. The tank 27 may be charged with compressed air in any desired manner and to that end it may have a nipple and inlet valve adapted for connection to a hand pump or to the air hose at a gasoline service station.

It will be understood that exhaust from the engine may be used as the motive fluid and controlled by a suitable valve instead of using compressed air, or, the cylinders 21, 22 may be operated by vacuum from the vacuum tank of the automobile, under suitable valve control.

In lieu of cylinders, solenoids, controlled by suitable switch means, may be used for moving the rack 9 in one direction or the other.

If the headlights are arranged in the usual, straight ahead manner, and it is desired to deflect them so that a driver approaching from the opposite direction will not be subject to their glare, the rack 9 is actuated by its operating means. The first part of the movement of the rack causes the inclined or cam walls of the interdental spaces 11 to force the rollers 13 upwardly, thereby elevating the latching device 12 and withdrawing the locking projection 14 from engagement with the arm 8. This releases the arm 8 so that further movement of the rack 9 causes the end of the slot 15 to engage the arm 8 and swing it from its normal position to its deflected position, thereby turning the headlights. Immediately after this action has occurred, the latching member drops down again because the shifting of the rack 9 then causes the rollers 13 to clear the crests of the teeth 10 up which they have ridden. The latch then relocks the rack 9 and the projection 14 falls down in front of the arm 8, locking the latter in the shifted position. Consequently the headlights will remain in their deflected arrangement until the rack is moved in the opposite direction. When this is done, a reversal of action of the latching device takes place. The projection 14 is first freed from the arm 8 by the rising of the latching device; the rack then shifts further, carrying along with it the arm 8 to bring it back to normal position; the latching device then drops to relock the rack.

The guide plates 16 prevent displacement of the latching device 12 in the direction of travel of the rack 9.

What I claim is:

1. Means for swinging headlights comprising a rockably mounted member for turning the headlights, a latch mounted independently of said rockably mounted member adapted for latching the member in its respective positions, and a movable actuator adapted, when operated, to first mechanically automatically release the latch from the rockably mounted member and then swing said rockably mounted member.

2. Means for swinging headlights comprising the combination of a rockably mounted member for turning the headlights, means for latching said member in its respective positions, and a movable toothed rack adapted, when operated, to first mechanically automatically unlatch the rockably mounted member and then to swing said rockably mounted member.

3. Means for swinging headlights comprising a rockably mounted member for turning the headlights, a slidably mounted latch, independent of said rockably mounted member, adapted to lock said rockably mounted member, and a movable actuator adapted first to release the latch and thereafter to swing the rockably mounted member.

4. Means for swinging headlights comprising a rockably mounted member for turning the headlights, a slidable latch mounted independently of said member adapted for locking said rockably mounted member in its different positions, and a slidably mounted toothed rack adapted first to release the latch from the member and thereafter to swing said member.

5. Means for swinging headlights comprising operating devices, a slidably mounted rack movable in one direction or the other under the control of said devices, said rack having teeth provided with pointed crests and inclined sides, and a latch slidable in a general cross-wise direction relative to said rack and having means to enter the spaces between the teeth for the purpose of locking the rack, said latch being displaced by the teeth when the rack moves, said rack having an operative connection to the headlight mounting so that the movements of the rack will result in swinging the headlights, said latch serving to lock the rack and also the headlight swinging means.

In testimony whereof I affix my signature.

JOHN RAPHAEL CAMBRON.